United States Patent Office 3,357,948
Patented Dec. 12, 1967

3,357,948
PHENOLIC COMPOUND HAVING
ANTIOXIDANT PROPERTIES
Hans H. Stockmann, Plainfield, N.J., and Horace W.
Blakeslee, Jr., Havertown, Pa., assignors to FMC Corporation, Philadelphia, Pa., a corporation of Delaware
No Drawing. Filed July 15, 1964, Ser. No. 382,960
3 Claims. (Cl. 260—45.95)

ABSTRACT OF THE DISCLOSURE

A resinous polymer of an alpha-mono-olefin containing an antioxidant amount of 2,6-di(3a,4,5,6,7,7a-hexahydro-4,7-methanoindanyl)-para-cresol, is disclosed herein.

It is an object of this invention to provide a novel phenolic derivative.

It is another object of this invention to provide an inexpensively prepared, novel phenolic derivative having improved antioxidant properties in certain resins.

It is still another object of this invention to provide a polyolefin composition containing an oxidation stabilizing novel, phenolic derivative.

These and other objects are accomplished in accordance with this invention which comprises 2,6-di(3a,4,5,6,7,7a-hexahydro-4,7-methanoindanyl)-para-cresol. The invention also includes a composition comprising an olefin polymer and an oxidation stabilizing amount of 2,6-di(3a,4,5,6,7,7a-hexahydro - 4,7 - methanoindanyl) - para-cresol.

The compound of the invention is formed in brief by reacting dihydrodicyclopentadiene wtih p-cresol under Friedel-Crafts conditions.

The olefin polymers for the compositions of this invention are preferably formed from alpha-olefins having from 2 to 8 carbon atoms. Examples of these include ethylene, propylene, butylene, isobutylene, amylene, isoamylene, hexylene, heptylene and octylene. Olefinic copolymers such as ethylene-propylene and ethylene-isobutylene are also included as useful polymers for the compositions of this invention. On the basis of availability and economics, polymers of ethylene, propylene and isobutylene are preferred.

An example of the preparation of the novel phenolic compound of this invention is as follows:

Example

Dicyclopentadiene is selectively hydrogenated in a pressure vessel at 1–2 atm. of hydrogen pressure and at about 10° C. in the presence of 5% Raney nickel, based on the weight of the dicyclopentadiene, for about 1 hour.

The product, dihydrodicyclopentadiene is then alkylated by first heating 1 mol of p-cresol together with 10% by weight of a 5% boron trifluoride etherate to obtain a solution. Then, 2 mol of dihydrodicyclopentadiene is added slowly to the solution to maintain a reaction temperature between 50 and 100° C. for several hours. The product was neutralized with aqueous sodium carbonate, extracted with ether and distilled from the ether solution. The residue was further distilled at a pressure of one micron and about 250° C. to obtain a light yellow glass which was ground to a powder.

Analytical testing indicated that 2,6-di(hexahydromethanoindanyl)-4-methyl phenol had been formed.

The structural formula for the new compound is as follows:

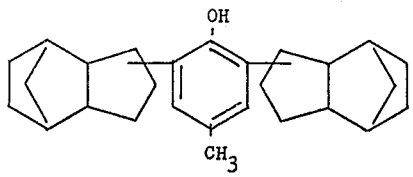

The above compound was tested as an oxidation inhibitor in polypropylene resin and found to be about as effective as the best, costly, commercially available stabilizer. Thus, this compound has been found to be an excellent, low cost antioxidant for polyolefin resins. The amount of the new antioxidant used in the polyolefin resin composition ranges from 0.001 up to 5% and preferably from 0.01 to 1% based on the weight of the inhibited polymer.

The new compound of this invention may also be used as an antioxidant for lubricating compositions and similar substances.

Various changes and modifications may be made practicing the invention without departing from the spirit and scope thereof and, therefore, the invention is not to be limited except as defined in the appended claims.

We claim:
1. A composition comprising a resinous polymer of an alpha-mono-olefin having from 2 to 8 carbon atoms, and an antioxidant amount of 2,6-di(3a,4,5,6,7,7a-hexahydro-4,7-methanoindanyl)-para-cresol.
2. The composition of claim 1 wherein the antioxidant amount is from 0.001 to 5%, based on the weight of the polymer.
3. The composition of claim 1 wherein the resinous polymer is a polymer of ethylene, propylene, isobutylene, or mixtures of these monomers, and the antioxidant amount is from 0.01 to 1%, based on the weight of the polymer.

References Cited

UNITED STATES PATENTS

| | | | |
|---|---|---|---|
| 1,842,989 | 1/1932 | Kropp et al. | 260—45.95 |
| 2,952,662 | 9/1960 | Wald | 260—45.95 |
| 3,036,138 | 5/1962 | Mingasson | 260—45.95 |

DONALD E. CZAJA, Primary Examiner.

H. E. TAYLOR, JR., Assistant Examiner.